(12) United States Patent
Huang et al.

(10) Patent No.: US 10,063,546 B2
(45) Date of Patent: Aug. 28, 2018

(54) NETWORK ACCESS CONTROL METHOD AND APPARATUS

(71) Applicant: Huawei Device (Dongguan) Co., Ltd., Dongguan (CN)

(72) Inventors: Xi Huang, Shenzhen (CN); Yongfeng Tu, Shenzhen (CN); Huangwei Wu, Shenzhen (CN)

(73) Assignee: HUAWEI DEVICE (DONGGUAN) CO., LTD., Dongguan (CN)

( * ) Notice: Subject to any disclaimer, the term of this patent is extended or adjusted under 35 U.S.C. 154(b) by 24 days.

(21) Appl. No.: 15/021,812

(22) PCT Filed: Nov. 13, 2014

(86) PCT No.: PCT/CN2014/091033
§ 371 (c)(1),
(2) Date: Mar. 14, 2016

(87) PCT Pub. No.: WO2015/070784
PCT Pub. Date: May 21, 2015

(65) Prior Publication Data
US 2016/0234212 A1    Aug. 11, 2016

(30) Foreign Application Priority Data

Nov. 15, 2013 (CN) .......................... 2013 1 0574112

(51) Int. Cl.
*H04L 29/06* (2006.01)
*G06F 21/00* (2013.01)
(Continued)

(52) U.S. Cl.
CPC ........ *H04L 63/0876* (2013.01); *H04L 63/104* (2013.01); *H04L 63/1416* (2013.01);
(Continued)

(58) Field of Classification Search
CPC . H04L 63/0876; H04L 63/20; H04L 63/1416; H04L 67/141; H04L 63/104; H04W 12/08
See application file for complete search history.

(56) References Cited

U.S. PATENT DOCUMENTS

| 2003/0100308 | A1 | 5/2003 | Rusch |
| 2006/0094400 | A1* | 5/2006 | Beachem .............. H04L 63/101 455/410 |
| 2012/0127925 | A1* | 5/2012 | Kim ...................... H04L 63/104 370/328 |

FOREIGN PATENT DOCUMENTS

| CN | 1618208 A | 5/2005 |
| CN | 101304318 A | 11/2008 |

(Continued)

OTHER PUBLICATIONS

Prasad Naldurg, Roy H. Campbell; "Dynamic access control: preserving safety and trust for network defense operations"; Jun. 2003; SACMAT '03: Proceedings of the eighth ACM symposium on Access control models and technologies; Publisher: ACM; pp. 231-237.*

(Continued)

*Primary Examiner* — Kendall Dolly
*Assistant Examiner* — Courtney Fields
(74) *Attorney, Agent, or Firm* — Conley Rose, P.C.

(57) ABSTRACT

A network access control method and apparatus. The network access control method includes configuring network access permission of a first application, where the network access permission includes allowing the first application to access a network resource using a first type of network access point, and the first type of network access point includes at least one first network access point, accessing a second network access point, where the second network access point belongs to the first type of network access point, and when the first application is running, allowing the first (Continued)

application to access the network resource using the second network access point, and when a third network access point is accessed, and when the third network access point does not belong to the first type of network access point, prohibiting the first application from accessing the network resource using the third network access point.

16 Claims, 8 Drawing Sheets

(51) Int. Cl.
*H04W 12/08* (2009.01)
*H04L 29/08* (2006.01)
*H04W 12/06* (2009.01)
*H04W 36/08* (2009.01)

(52) U.S. Cl.
CPC ............ *H04L 63/20* (2013.01); *H04L 67/141* (2013.01); *H04W 12/08* (2013.01)

(56) References Cited

FOREIGN PATENT DOCUMENTS

| CN | 101567878 A | 10/2009 | |
|---|---|---|---|
| CN | 101860534 A | 10/2010 | |
| CN | 101867579 A | 10/2010 | |
| CN | 102170495 A | 8/2011 | |
| CN | 102573107 A | 7/2012 | |
| CN | 101841878 B | 6/2013 | |
| EP | 1343345 A2 * | 9/2003 | ......... H04L 63/0823 |
| EP | 2456264 A2 | 5/2012 | |
| JP | 2003233543 A | 8/2003 | |

OTHER PUBLICATIONS

Machine Translation and Abstract of Japanese Publication No. JP2003233543, dated Aug. 22, 2003, 19 pages.
Foreign Communication From a Counterpart Application, Chinese Application No. 201310574112.3, Chinese Office Action dated May 2, 2017, 7 pages.
Partial English Translation and Abstract of Chinese Patent Application No. CN101841878, dated Oct. 25, 2016, 14 pages.
Partial English Translation and Abstract of Chinese Patent Application No. CN101860534, dated Mar. 15, 2016, 7 pages.
Foreign Communication From a Counterpart Application, PCT Application No. PCT/CN2014/091033, English Translation of International Search Report dated Jan. 28, 2015, 2 pages.
Foreign Communication From a Counterpart Application, PCT Application No. PCT/CN2014/091033, English Translation of Written Opinion dated Jan. 28, 2015, 6 pages.
Foreign Communication From a Counterpart Application, European Application No. 14863031.2, Extended European Search Report dated Jun. 22, 2016, 6 pages.
Machine Translation and Abstract of Chinese Publication No. CN102170495, Aug. 31, 2011, 12 pages.
Foreign Communication From A Counterpart Application, Chinese Application No. 201310574112.3, Chinese Office Action dated Apr. 24, 2018, 7 pages.

* cited by examiner

NETWORK ACCESS CONTROL METHOD AND APPARATUS

CROSS-REFERENCE TO RELATED APPLICATIONS

This application is a U.S. National Stage of International Application No. PCT/CN2014/091033, filed on Nov. 13, 2014, which claims priority to Chinese Patent Application No. 201310574112.3, filed on Nov. 15, 2013, both of which are hereby incorporated by reference in their entireties.

TECHNICAL FIELD

Embodiments of the present disclosure pertain to the field of network communications technologies, and in particular, relate to a network access control method and apparatus.

BACKGROUND

Currently, with the popularization of application of networks and electronic devices, a user may frequently switch between different networks using an electronic device, and in this way, a same application may be executed in different networks.

For example, the user runs a Digital Living Network Alliance (DLNA) shared application at home in order to share a multimedia resource on the electronic device with family members. After the user goes to an airport from home, the electronic device accesses a free wireless fidelity (WI-FI) network at the airport. If the electronic device is still running the DLNA shared application at the moment, another electronic device that is in the same WI-FI network with the user may access the multimedia resource in the DLNA shared application.

Alternatively, the user is using a sensitive application such as online banking in the electronic device, and when the user switches from a home network to a free WI-FI network in a public place, the online banking application continues to run on the free WI-FI network in the public place.

However, an access point of a free WI-FI network in a public place may be established by a hacker to steal user data. Therefore, when a network connection of the electronic device is switched to a free WI-FI network corresponding to such an AP, user data is stolen by a hacker, thereby reducing security of the user data.

SUMMARY

In view of this, an objective of embodiments of the present disclosure is to provide a network access control method in order to resolve a problem in the prior art that security of user data is reduced because an electronic device accesses a free WI-FI network corresponding to an access point established by a hacker. The embodiments of the present disclosure further provide a network access control apparatus in order to ensure actual implementation and application of the foregoing method. The technical solutions are as follows.

According to a first aspect, an embodiment of the present disclosure provides a network access control method, including configuring network access permission of a first application, where the network access permission includes allowing the first application to access a network resource using a first type of network access point, and the first type of network access point includes at least one first network access point, accessing a second network access point, where the second network access point belongs to the first type of network access point, when the first application is running, allowing the first application to access the network resource using the second network access point, and when a third network access point is accessed, if the third network access point does not belong to the first type of network access point, prohibiting the first application from accessing the network resource using the third network access point.

In a first feasible manner of the first aspect, before the accessing the second network access point, the method further includes accessing a fourth network access point, where the fourth network access point does not belong to the first type of network access point, running the first application, and determining that a network access point in a currently available network access point is a fifth network access point, and if the fifth network access point belongs to the first type of network access point, using the fifth network access point as the second network access point.

With reference to the first feasible manner of the first aspect, in a second feasible manner of the first aspect, if the fifth network access point does not belong to the first type of network access point, a sixth network access point is used as the second network access point, where the sixth network access point belongs to the first type of network access point.

With reference to the second feasible manner of the first aspect, in a third feasible manner of the first aspect, the using the sixth network access point as the second network access point includes selecting at least one first network access point in the first type of network access point as the sixth network access point, activating a network connection function that is used to connect the selected sixth network access point, and if the selected sixth network access point is available, using the sixth network access point as the second network access point.

In a fourth feasible manner of the first aspect, if the third network access point does not belong to the first type of network access point, the first application is stopped.

With reference to the first aspect or any one of the first to fourth feasible manners of the first aspect, in a fifth feasible manner of the first aspect, after the third network access point is accessed, the method further includes keeping a connection to the second network access point.

With reference to the fifth feasible manner of the first aspect, in a sixth feasible manner of the first aspect, after the keeping a connection to the second network access point, the method further includes keeping the first application accessing the network resource using the second network access point.

With reference to the first aspect or any one of the first to fourth feasible manners of the first aspect, in a seventh feasible manner of the first aspect, the first network access point is a network access point that has trust permission, where the trust permission is used to identify a trust degree of the network access point.

According to a second aspect, an embodiment of the present disclosure provides a network access control apparatus, including a configuring unit configured to configure network access permission of a first application, where the network access permission includes allowing the first application to access a network resource using a first type of network access point, and the first type of network access point includes at least one first network access point, an accessing unit configured to access a second network access point, where the second network access point belongs to the first type of network access point, a first control unit configured to, when the first application is running, allow the first application to access the network resource using the second network access point, and a second control unit configured to, when a third network access point is accessed, if the third network access point does not belong to the first type of network access point, prohibit the first application from accessing the network resource using the third network access point.

In a first feasible manner of the second aspect, the accessing unit is further configured to access a fourth network access point, and the fourth network access point does not belong to the first type of network access point, and the apparatus further includes a running unit, a determining unit, and a first judging unit, where the running unit is configured to run the first application, the determining unit is configured to determine that a network access point in a currently available network access point is a fifth network access point, and the first judging unit is configured to, if the fifth network access point belongs to the first type of network access point, use the fifth network access point as the second network access point.

With reference to the first feasible manner of the second aspect, in a second feasible manner of the second aspect, the apparatus further includes a second judging unit configured to, if the fifth network access point does not belong to the first type of network access point, use a sixth network access point as the second network access point, where the sixth network access point belongs to the first type of network access point.

With reference to the second feasible manner of the second aspect, in a third feasible manner of the second aspect, the second judging unit includes a selecting subunit, an activating subunit, and a judging subunit, where the selecting subunit is configured to select at least one first network access point in the first type of network access point as the sixth network access point, the activating subunit is configured to activate a network connection function that is used to connect the selected sixth network access point, and the judging subunit is configured to if the selected sixth network access point is available, use the sixth network access point as the second network access point.

In a fourth feasible manner of the second aspect, the second control unit is further configured to, if the third network access point does not belong to the first type of network access point, stop the first application.

With reference to the second aspect or any one of the first to fourth feasible manners of the second aspect, in a fifth feasible manner of the second aspect, the accessing unit is further configured to keep a connection to the second network access point.

With reference to the fifth feasible manner of the second aspect, in a sixth feasible manner of the second aspect, the first control unit is further configured to keep the first application accessing the network resource using the second network access point.

With reference to the second aspect or any one of the first to fourth feasible manners of the second aspect, in a seventh feasible manner of the second aspect, the first network access point is a network access point that has trust permission, where the trust permission is used to identify a trust degree of the network access point.

In the embodiments of the present disclosure, network access permission is configured for a first application, where the network access permission includes allowing the first application to access a network resource using a first type of network access point, if a third network access point that does not belong to the first type of network access point is accessed, the first application is prohibited from accessing the network resource using the third network access point, thereby improving network security. Further, when an electronic device accesses a network resource with relatively high security, security of a user resource that uses the electronic device can be improved.

BRIEF DESCRIPTION OF DRAWINGS

To illustrate the technical solutions in the embodiments of the present disclosure or in the prior art more clearly, the following briefly describes the accompanying drawings required for describing the embodiments or the prior art. The accompanying drawings in the following description merely show some embodiments of the present disclosure, and persons of ordinary skill in the art can derive other drawings from the accompanying drawings without creative efforts.

DESCRIPTION OF EMBODIMENTS

The following first briefly describes a network access control method provided in embodiments of the present disclosure, where the network access control method may include configuring network access permission of a first application, where the network access permission includes allowing the first application to access a network resource using a first type of network access point, and the first type of network access point includes at least one first network access point, accessing a second network access point, where the second network access point belongs to the first type of network access point, when the first application is running, allowing the first application to access the network resource using the second network access point, and when a third network access point is accessed, if the third network access point does not belong to the first type of network access point, prohibiting the first application from accessing the network resource using the third network access point.

In the embodiments of the present disclosure, network access permission is configured for a first application, where the network access permission includes allowing the first application to access a network resource using a first type of network access point. If a third network access point that does not belong to the first type of network access point is accessed, the first application is prohibited from accessing the network resource using the third network access point, thereby improving network security. Further, when an electronic device accesses a network resource with relatively high security, security of a user resource that uses the electronic device can be improved.

To make the objectives, technical solutions, and advantages of the embodiments of the present disclosure clearer, the following clearly and completely describes the technical solutions in the embodiments of the present disclosure with reference to the accompanying drawings in the embodiments of the present disclosure. The described embodiments are some of the embodiments of the present disclosure but not all of the embodiments. All other embodiments obtained by a person of ordinary skill in the art based on the embodiments in the embodiments of the present disclosure without creative efforts shall fall within the protection scope of the embodiments of the present disclosure.

Figure 1:
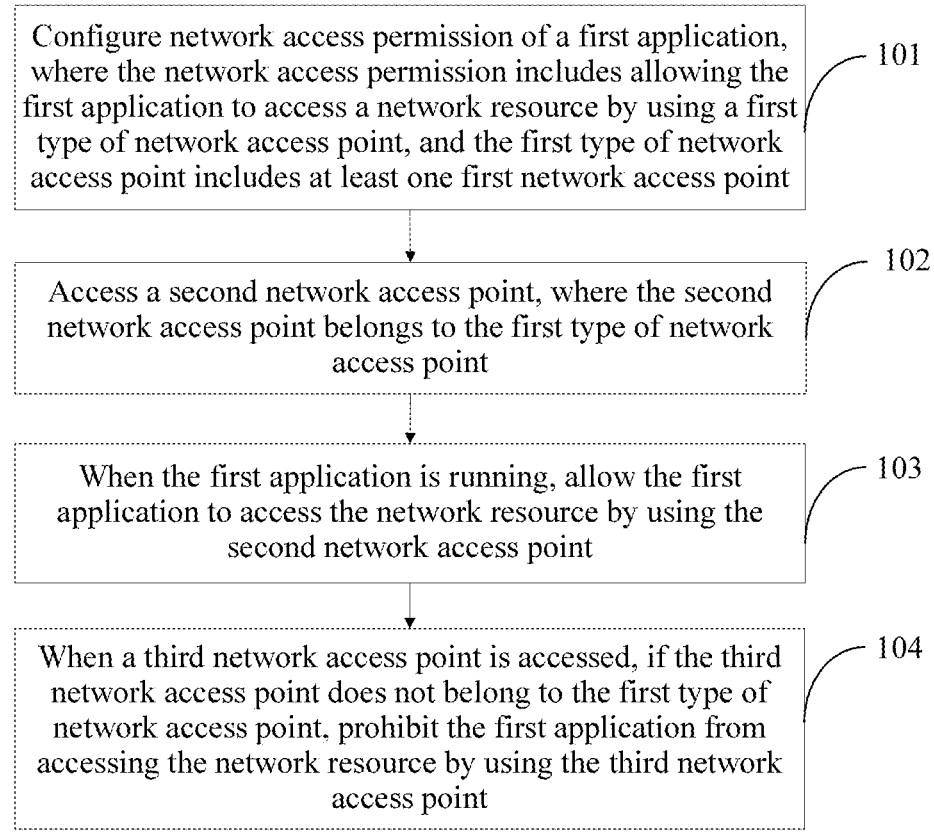
FIG. 1 is a flowchart of a network access control method according to an embodiment of the present disclosure.

Referring to FIG. 1, FIG. 1 shows a flowchart of a network access control method according to an embodiment of the present disclosure, and the method may include the following steps.

Step 101: Configure network access permission of a first application, where the network access permission includes allowing the first application to access a network resource using a first type of network access point, and the first type of network access point includes at least one first network access point.

It can be understood that the first type of network access point may be configured according to an application feature of the first application. For example, when the first application is an online play video, because the online play video has an application feature that a required data volume is relatively large and a data transmission rate is required to be high, a third generation (3G) type of network access point may be configured for the online play video, and the 3G type of network access point is used as the first type of network access point. Accordingly, the first network access point is a 3G network access point.

Likewise, when the first application is instant communication software, because the instant communication software has a relatively high requirement for immediacy of communication, a network access point that supports communication anytime and anywhere needs to be configured for the instant communication software. A wireless network can satisfy this requirement. Therefore, a wireless type of access point may be used as a first type of network access point of the instant communication software, and a wireless network access point is used as the first network access point.

Figure 2:
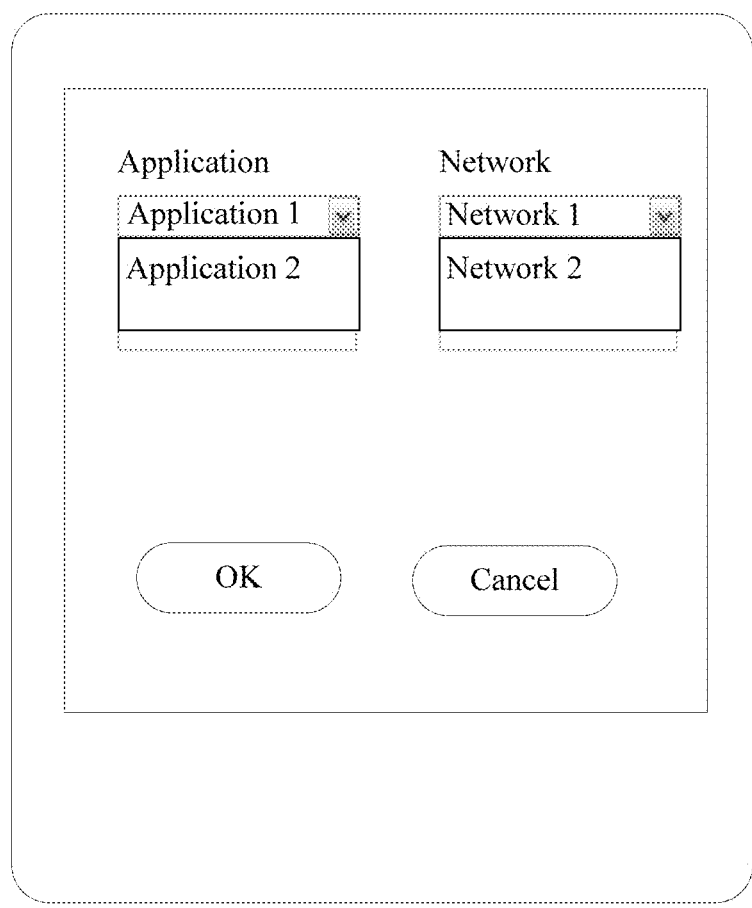
FIG. 2 is a schematic diagram of a human-computer interaction interface according to an embodiment of the present disclosure.

Certainly, in actual use of an electronic device, a human-computer interaction interface shown in FIG. 2 may be displayed on a display interface of the electronic device, where the human-computer interaction interface is used to manually configure the network access permission of the first application. After the corresponding network access permission is configured, the first application may access the network resource using the configured first type of network access point.

The human-computer interaction interface includes two drop-down boxes, application and network. A user may select, from the application drop-down box, a first application for which a network needs to be configured. After selecting the first application for which a network needs to be configured, the user further selects a network type from the network drop-down box, and after an OK button is clicked, an access point of the selected network type is used as a first type of network access point of the first application.

Each time after a network is selected and the OK button is clicked, it indicates that a type of first network access point is configured for the first application. In actual configuration, the user may configure a first network access point that involves a single type for the first application, or may configure first network access points that involve multiple types.

Figure 3:
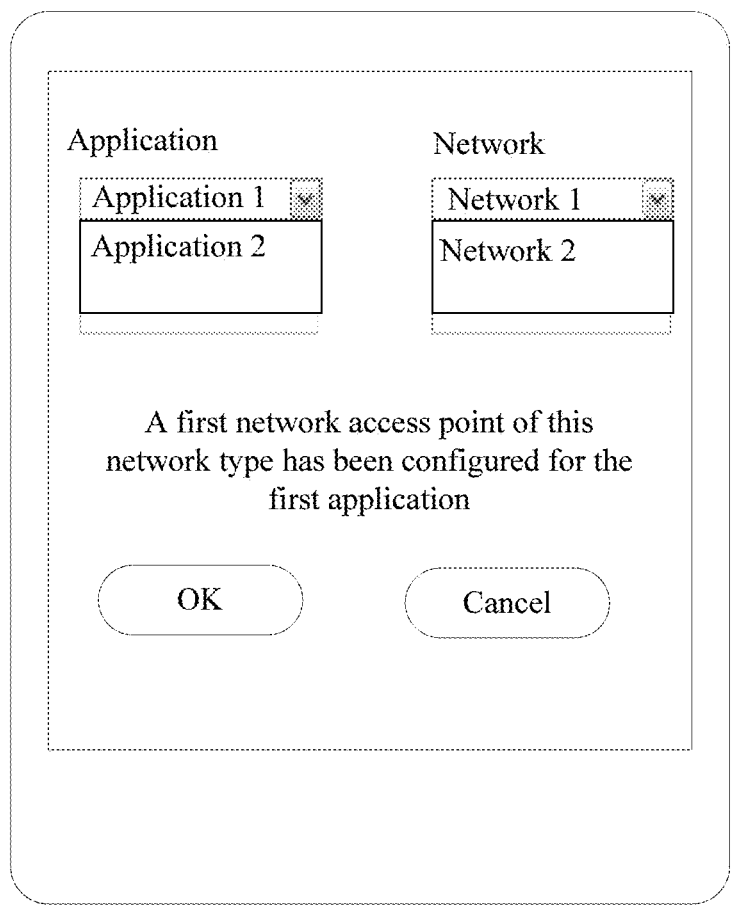
FIG. 3 is a schematic diagram of another human-computer interaction interface according to an embodiment of the present disclosure.

Certainly, if a network selected by the user is a network that has been configured for the first application, "A first network access point of this network type has been configured for the first application" may be displayed on the human-computer interaction interface, as shown in FIG. 3 in order to prompt the user not to configure a first network access point of the same network type for the first application again.

Figure 4:
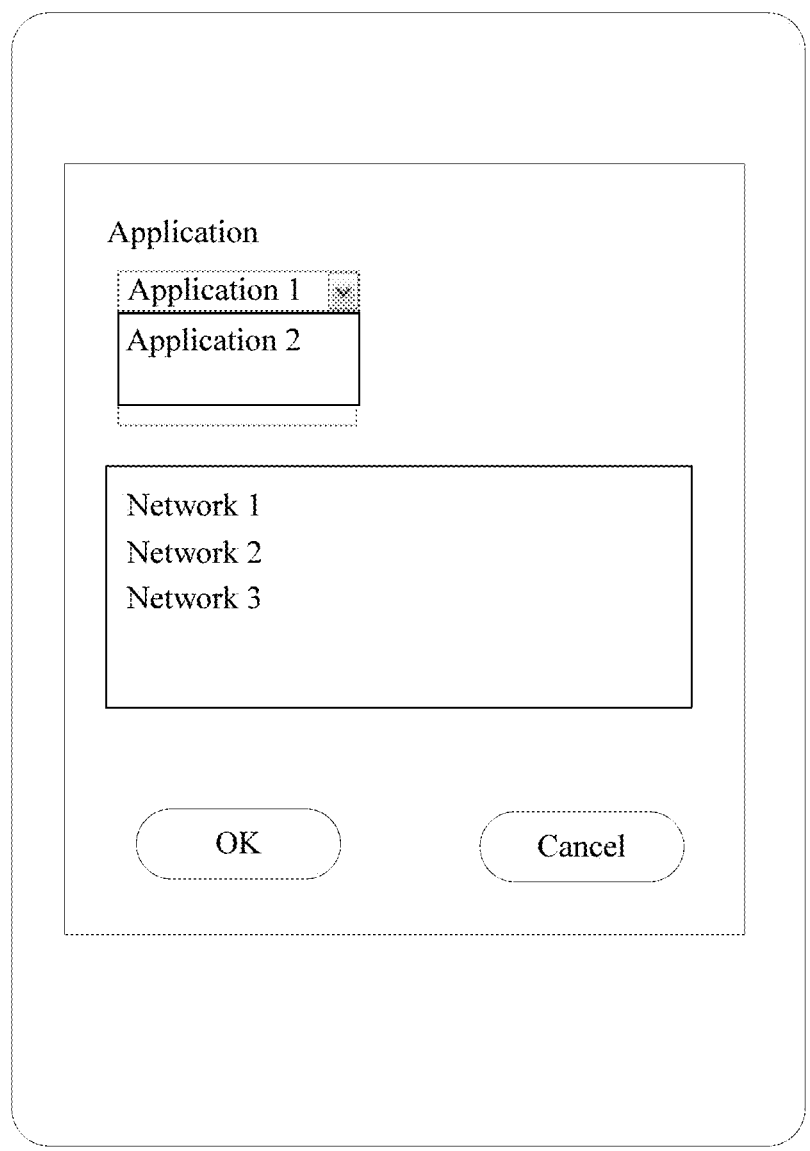
FIG. 4 is a schematic diagram of still another human-computer interaction interface according to an embodiment of the present disclosure.

In addition, the human-computer interaction interface displayed on the display interface of the electronic device may also use a manner show in FIG. 4, and an optional network is displayed in a box below the application drop-down box. After the user selects a first application, multiple networks in the box may be selected at the same time, and first network access points of multiple network types are configured for the first application.

When a first network access point is manually configured for various first applications, the electronic device records, in a configuration file, the network type and the first network access point that are configured and the first applications, as shown below.

```
<network-config>
<app_name="app_1">
<network_type="WI-FI">
<ap_mac_add=" 00-23-5A-15-99-42">
</network-config>
``` app_name represents a name of a first application, network type represents a $network_{13}$ type, which may include a second generation (2G) mobile communications technology network, a 3G network, a WI-FI network, and an long term evolution (LTE) network, ap_mac_add represents a media access control (MAC) address of the WI-FI network.

It should be noted that, for the 2G network, the 3G network, and the LTE network, these networks are provided by an operator, and construction of these network is much more complex relative to construction of the WI-FI network. Therefore, a hacker generally can only tamper with the MAC address of the WI-FI network. Therefore, when configurations of the foregoing first applications are being recorded, and when WI-FI is recorded in network_type, the MAC address of the WI-FI network needs to be correspondingly recorded in ap_mac_add. When 2G, 3G, and LTE are recorded in network_type, ap_mac_add is correspondingly left blank.

In this embodiment of the present disclosure, the first network access point may be a wireless network access point, where the wireless network access point may include at least one of the following access points: a 2G network access point, a 3G network access point, an LTE network access point, a WI-FI network access point, a BLUETOOTH network access point, a ZIGBEE network access point, and a wireless local area network (WLAN) authentication and privacy infrastructure (WAPI) network access point. The first network access point may also be a wired network access point, where the wired network access point may include an Ethernet access point, a universal serial bus (USB) network shared access point, and the like. Certainly, the first network access point may also include both a wireless network access point and a wired network access point. Furthermore, the electronic device may allocate any one type of or multiple types of access points to a first application according to an application feature of the first application, which is not limited in this embodiment of the present disclosure.

Certainly, the first network access point may also be a network access point that has trust permission, where the trust permission is used to identify a trust degree of the network access point. The trust degree may be represented using a _TRUST_LEVEL field in a network identifier table shown in Table 1. The _TRUST_LEVEL field is a network identifier. When the network identifier is a trust identifier TRUE, it indicates that the network access point is a first network access point that belongs to the first type of network access point, and the first application is allowed to access the network resource using the network access point. When the network identifier is any one of distrust identifiers UNDEFINED and FALSE, it indicates that the network access point does not belong to the first network access point of the first type of network access point, and the first application is prohibited from accessing the network resource using the network access point.

TABLE 1

Network identifier table

| _NO | _NAME | _TRUST_LEVEL |
| --- | --- | --- |
| 1 | Network_A | UNDEFINED |
| 2 | Network_B | FALSE |
| 3 | Network_C | TRUE |

In addition, in a running process of the electronic device, the user may also change a network identifier in the network identifier table, for example, change a network identifier of Network_A to TRUE. Certainly, the user may also add a network identifier of another network to the network identifier table.

Step 102: Access a second network access point, where the second network access point belongs to the first type of network access point.

Step 103: When the first application is running, allow the first application to access the network resource using the second network access point.

In this embodiment of the present disclosure, after being powered on, the electronic device may directly access the second network access point that belongs to the first type of network access point, where the second network access point is a first network access point in the first type of network access point in order to ensure that when running the first application, the electronic device may access the network resource using the second network access point, thereby improving execution efficiency of the first application.

The network resource is an information resource that is propagated using a communication device and that is managed using network software using a computer system, such as a video uploaded to a network.

Step 104: When a third network access point is accessed, if the third network access point does not belong to the first type of network access point, prohibit the first application from accessing the network resource using the third network access point.

After accessing the third network access point, the electronic device first determines whether the third network access point belongs to the first type of network access point. If the third network access point belongs to the first type of network access point, the first application is allowed to access the network resource using the third network access point.

If the third network access point does not belong to the first type of network access point, it indicates that when the first application is configured, the first application is prohibited from accessing the network resource using the third network access point. In this case, the electronic device prohibits the first application from sending or receiving information using the third network access point, and prohibits the first application from accessing the network resource using the third network access point in order to improve network security. After the network security is improved, security of a user resource that accesses the network is accordingly improved.

Figure 5A:
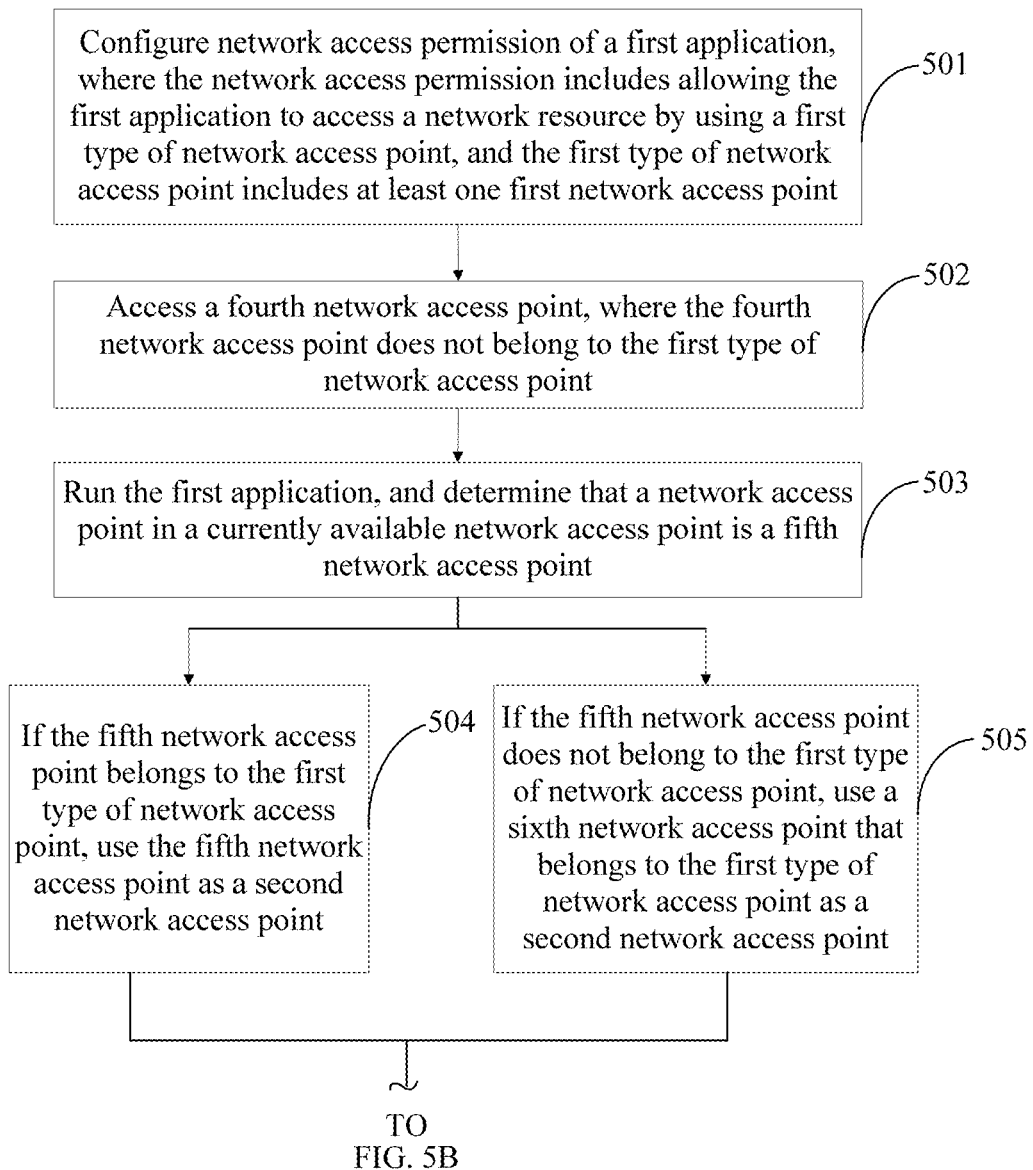
FIG. 5A and FIG. 5B are another flowchart of a network access control method according to an embodiment of the present disclosure.
Figure 5B:
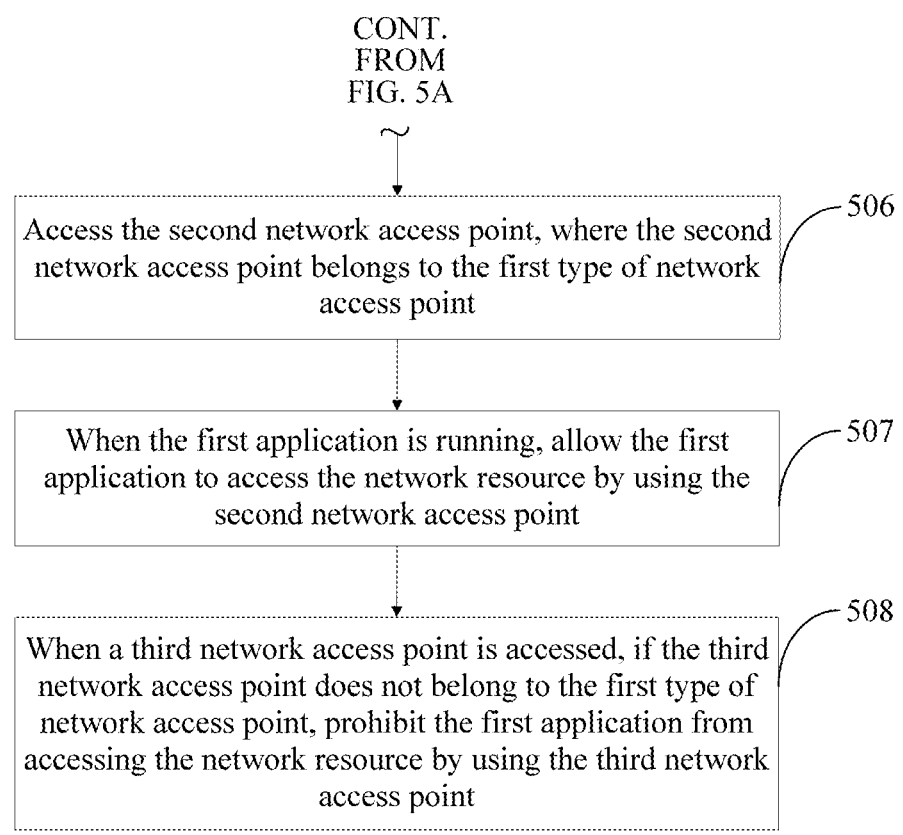

Referring to FIG. 5A and FIG. 5B, FIG. 5A and FIG. 5B show another flowchart of a network access control method according to an embodiment of the present disclosure, and the method may include the following steps.

Step 501: Configure network access permission of a first application, where the network access permission includes allowing the first application to access a network resource using a first type of network access point, and the first type of network access point includes at least one first network access point.

Step 501 is the same as step 101, and is not described in this embodiment of the present disclosure again.

Step 502: Access a fourth network access point, where the fourth network access point does not belong to the first type of network access point.

In this embodiment of the present disclosure, a quantity of first applications that are in an electronic device and for which the network access permission needs to be configured is limited. If the electronic device directly accesses a second network access point after being powered on, when another application accesses the network resource, the electronic device needs to change an access point configuration. Therefore, in this embodiment of the present disclosure, the electronic device may directly access the fourth network access point that does not belong to the first type of network access point such that the another application can directly access the network resource after the electronic device is powered on.

Step 503: Run the first application, and determine that a network access point in a currently available network access point is a fifth network access point.

An icon of the first application is displayed on an interface of the electronic device, and after the icon of the first application is operated, the corresponding first application starts to run.

After the first application runs, the electronic device detects the currently available network access point, and after the currently available network access point is detected, one of the currently available network access point is selected as the fifth network access point. An available network access point refers to a network access point whose network connection function is activated and that is located in network coverage corresponding to the network access point.

Step 504: If the fifth network access point belongs to the first type of network access point, use the fifth network access point as a second network access point, and perform step 506.

Step 505: If the fifth network access point does not belong to the first type of network access point, use a sixth network access point as a second network access point, where the sixth network access point belongs to the first type of network access point, and perform step 506.

The electronic device detects whether the fifth network access point belongs to the first type of network access point, and if the fifth network access point belongs to the first type of network access point, the fifth network access point is used as the second network access point. If the fifth network access point does not belong to the first type of network access point, the sixth network access point that belongs to the first type of network access point is used as the second network access point.

A specific process of using the sixth network access point that belongs to the first type of network access point as the second network access point may be first selecting at least one first network access point in the first type of network access point as the sixth network access point, where the selected first network access point may be a configured network access point in step 501, and certainly the selected first network access point may also be a network access point that the electronic device accesses after the electronic device runs the first application, where the network access point is a trusted network access point selected by a user. After a network access point is selected by the user, the electronic device identifies that the network access point has trust permission in order to identify a trust degree of the network access point. For a trust degree identifier of the network access point, refer to Table 1.

After determining the sixth network access point, the electronic device activates a network connection function that is used to connect the selected sixth network access point. If the selected sixth network access point is available, the sixth network access point is used as the second network access point.

Activation refers to enabling the network connection function. For example, the electronic device performs actions such as turning on a WI-FI switch, turning on a data traffic switch, and turning on a BLUETOOTH switch, and corresponding network connection functions are activated. All wireless network connection functions have a specific use range limit. Therefore, being available is that in a current environment, the selected sixth network access point can be found by the electronic device and can be used for connection.

A WI-FI network connection function is used as an example. Activating the network connection function that is used to connect the selected sixth network access point is turning on the WI-FI switch of the electronic device. Then, a nearby available WI-FI network access point is found using a WI-FI module of the electronic device, and a network access point corresponding to the sixth network access point is searched for from the nearby available WI-FI network access point, and if the network access point is found, it indicates that the sixth network access point is available currently, and if the network access point is not found, the sixth network access point is unavailable currently.

The network connection function may be a wireless network connection function, where the wireless network connection function may include at least one of the following network connection functions: a BLUETOOTH network connection function, a WI-FI network connection function, a 2G/3G/fourth generation (4G) network connection function, a ZIGBEE network connection function, a WAPI network connection function, and the like. Certainly, the network connection function may also be a wired network connection function, which includes a USB network connection function, an Ethernet connection function, and the like.

In addition, the network connection function may include both a wireless network connection function and a wired network connection function. A type of the network connection function is the same as a type of the sixth network access point. If the sixth network access point is a WI-FI network access point, when the network connection function a WI-FI network connection function.

Step 506: Access the second network access point, where the second network access point belongs to the first type of network access point.

Step 507: When the first application is running, allow the first application to access the network resource using the second network access point.

Step 508: When a third network access point is accessed, if the third network access point does not belong to the first type of network access point, prohibit the first application from accessing the network resource using the third network access point.

Step 506 to step 508 are the same as step 102 to step 104, and are not described in this embodiment of the present disclosure again.

In this embodiment of the present disclosure, in a case in which a currently available fifth network access point does not belong to a first type of network access point, an electronic device selects at least one first network access point from the first type of network access point as a sixth network access point, activates a network connection function of the sixth network access point, and in a case in which the sixth network access point is available, accesses the sixth network access point as a second network access point, which improves operation flexibility.

Figure 6:
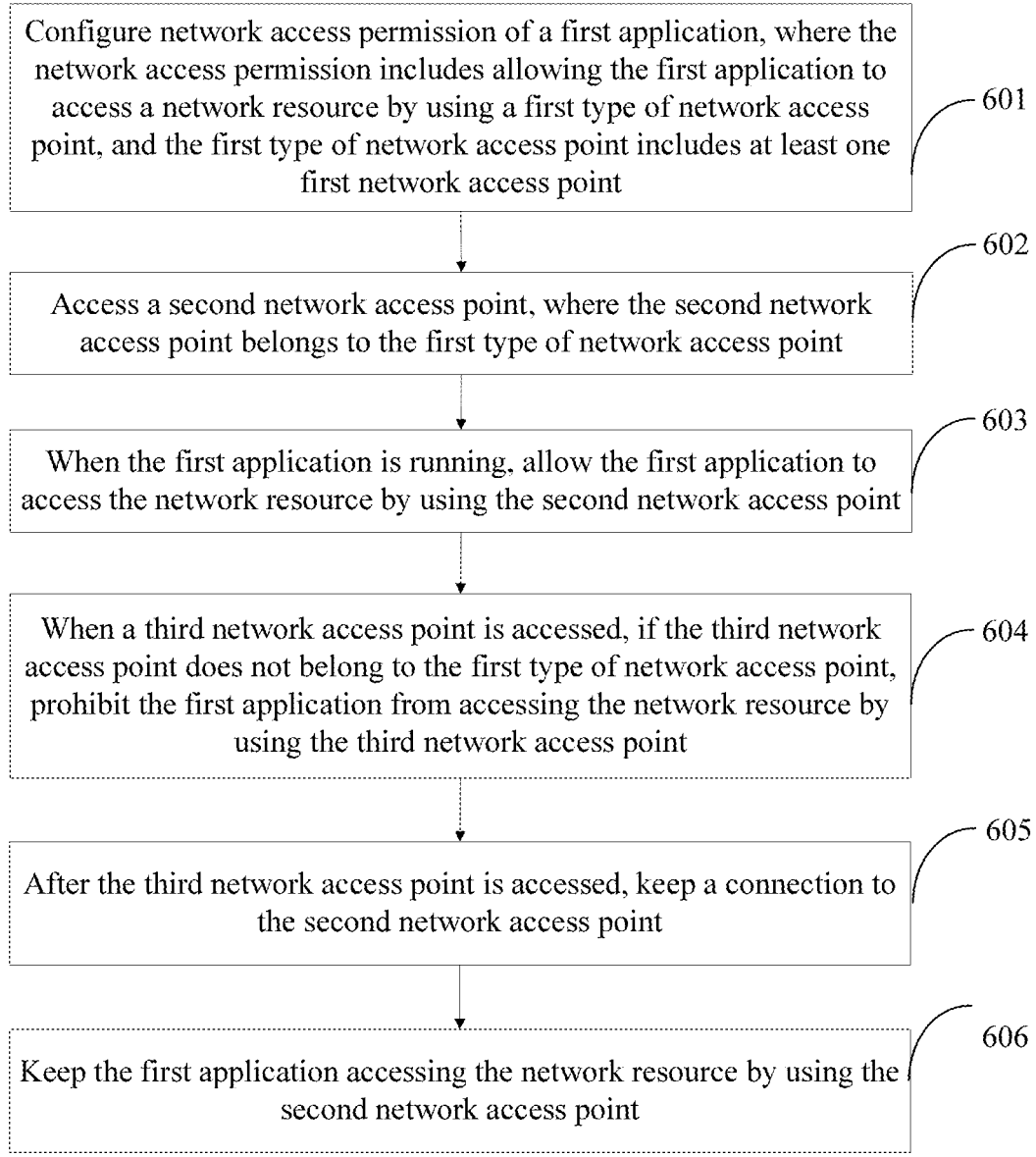
FIG. 6 is still another flowchart of a network access control method according to an embodiment of the present disclosure.

Referring to FIG. 6, FIG. 6 shows still another flowchart of a network access control method according to an embodiment of the present disclosure, where the network access control method shown in the flowchart may be applied to an electronic device that supports access of at least two types of network access points at the same time.

It can be understood that the electronic device may include multiple network modules, and each network module represents that access of a type of network access point is supported by the electronic device. For example, when the electronic device has a mobile network module and a WI-FI network module, it indicates that the electronic device can support access to both a mobile network and a WI-FI network. The mobile network may be a 2G network, or a 3G network, or an LTE network that is provided by an operator, which further needs to be determined by the mobile network module in the electronic device. Certainly, if the electronic device has two same network modules, such as WI-FI network modules, the electronic device can also support access to two WI-FI networks.

The foregoing network access control method shown in FIG. 6 may include the following steps.

Step 601 to step 604: the same as step 101 to step 104, and are not described in this embodiment of the present disclosure again.

Step 605: After the third network access point is accessed, keep a connection to the second network access point.

Step 606: Keep the first application accessing the network resource using the second network access point.

In this embodiment of the present disclosure, after an electronic device accesses a third network access point, the electronic device keeps a connection to a second network access point. In this case, a first application can still access a network resource using the second network access point, and another application may access the network resource using the third network access point, which improves flexibility of access point configuration.

Certainly, in the foregoing network access control method shown in FIG. 5A and FIG. 5B, the connection to the second network access point may also be kept after the third network access point is accessed such that the first application can still access the network resource using the second network access point.

In addition, in the foregoing network access control methods shown in FIG. 1, FIG. 5A, and FIG. 5B, after accessing the third network access point, the electronic device may stop the first application in order to prevent leakage of user data and improve security of the user data.

Figure 7:
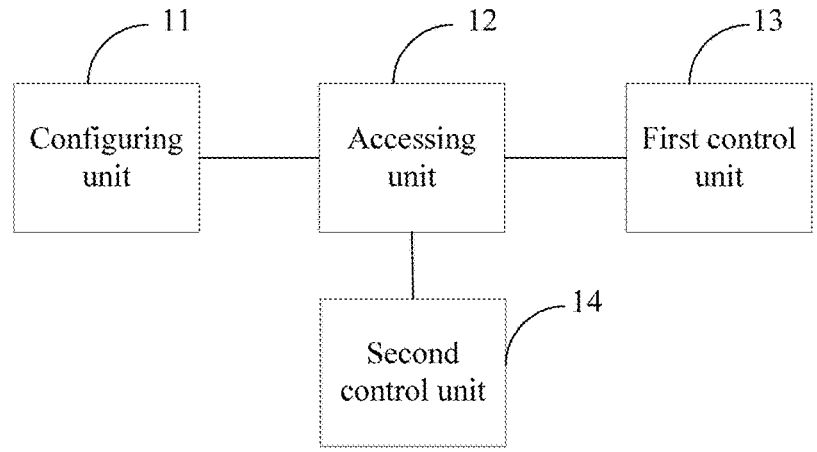
FIG. 7 is a schematic structural diagram of a network access control apparatus according to an embodiment of the present disclosure.

Corresponding to the foregoing method embodiments, an embodiment of the present disclosure further provides a network access control apparatus, where a schematic structural diagram of the network access control apparatus is shown in FIG. 7. The network access control apparatus may include a configuring unit 11, an accessing unit 12, a first control unit 13, and a second control unit 14.

The configuring unit 11 is configured to configure network access permission of a first application, where the network access permission includes allowing the first application to access a network resource using a first type of network access point, and the first type of network access point includes at least one first network access point.

It can be understood that the first type of network access point may be configured according to an application feature of the first application. For example, when the first application is an online play video, because the online play video has an application feature that a required data volume is relatively large and a data transmission rate is required to be high, a 3G mobile communications technology type of network access point may be configured for the online play video, and the 3G type of network access point is used as the first type of network access point. Accordingly, the first network access point is a 3G network access point.

Likewise, when the first application is instant communication software, because the instant communication software has a relatively high requirement for immediacy of communication, a network access point that supports communication anytime and anywhere needs to be configured for the instant communication software. A wireless network can satisfy this requirement. Therefore, a wireless type of access point may be used as a first type of network access point of the instant communication software, and a wireless network access point is used as the first network access point.

Certainly, in actual use of an electronic device, a human-computer interaction interface shown in FIG. 2 may be displayed on a display interface of the electronic device, where the human-computer interaction interface is used to manually configure the network access permission of the first application. After the corresponding network access permission is configured, the first application may access the network resource using the configured first type of network access point.

The human-computer interaction interface includes two drop-down boxes, application and network. A user may select, from the application drop-down box, a first application for which a network needs to be configured. After selecting the first application for which a network needs to be configured, the user further selects a network type from the network drop-down box, and after an OK button is clicked, an access point of the selected network type is used as a first type of network access point of the first application. Each time after a network is selected and the OK button is clicked, it indicates that a type of first network access point is configured for the first application. In actual configuration, the user may configure a first network access point that involves a single type for the first application, or may configure first network access points that involve multiple types.

Certainly, if a network selected by the user is a network that has been configured for the first application, "A first network access point of this network type has been configured for the first application" may be displayed on the human-computer interaction interface, as shown in FIG. 3 in order to prompt the user not to configure a first network access point of the same network type for the first application again.

In addition, the human-computer interaction interface displayed on the display interface of the electronic device may also use a manner show in FIG. 4, and an optional network is displayed in a box below the application drop-down box. After the user selects a first application, multiple networks in the box may be selected at the same time, and first network access points of multiple network types are configured for the first application.

When a first network access point is manually configured for various first applications, the electronic device records, in a configuration file, the network type and the first network access point that are configured and the first applications, as shown below.

```
<network-config>
  <app_name="app_1">
  <network_type="WI-FI">
  <ap_mac_add=" 00-23-5A-15-99-42">
</network-config>
``` app_name represents a name of a first application, network_type represents a network type, which may include a 2G mobile communications technology network, a 3G network, a WI-FI network, and an LTE network, ap_mac_add represents a MAC address of the WI-FI network.

It should be noted that, for the 2G network, the 3G network, and the LTE network, these networks are provided by an operator, and construction of these network is much more complex relative to construction of the WI-FI network. Therefore, a hacker generally can only tamper with the MAC address of the WI-FI network. Therefore, when configurations of the foregoing first applications are being recorded, and when WI-FI is recorded in network_type, the MAC address of the WI-FI network needs to be correspondingly recorded in ap_mac_add. When 2G, 3G, and LTE are recorded in network_type, ap_mac_add is correspondingly left blank.

In this embodiment of the present disclosure, the first network access point may be a wireless network access point, where the wireless network access point may include at least one of the following access points: a 2G network access point, a 3G network access point, an LTE network access point, a WI-FI network access point, a BLUETOOTH network access point, a ZIGBEE network access point, and a WAPI network access point. The first network access point may also be a wired network access point, where the wired network access point may include an Ethernet access point, a USB network shared access point, and the like. Certainly, the first network access point may also include both a wireless network access point and a wired network access point. Further, the electronic device may allocate any one type of or multiple types of access points to a first application according to an application feature of the first application, which is not limited in this embodiment of the present disclosure.

In addition, the first network access point may also be a network access point that has trust permission, where the trust permission is used to identify a trust degree of the network access point. The trust degree of the network access point may be identified using a network identifier shown in Table 1.

The accessing unit 12 is configured to access a second network access point, where the second network access point belongs to the first type of network access point.

The first control unit 13 is configured to, when the first application is running, allow the first application to access the network resource using the second network access point.

In this embodiment of the present disclosure, after the electronic device is powered on, the accessing unit 12 may directly access the second network access point that belongs to the first type of network access point, where the second network access point is a first network access point in the first type of network access point in order to ensure that when the electronic device runs the first application, the first control unit 13 may allow the first application to access the network resource using the second network access point, thereby improving execution efficiency of the first application.

The network resource is an information resource that is propagated using a communication device and that is managed using network software using a computer system, such as a video uploaded to a network.

The second control unit 14 is configured to, when a third network access point is accessed, if the third network access point does not belong to the first type of network access point, prohibit the first application from accessing the network resource using the third network access point.

If the third network access point does not belong to the first type of network access point, it indicates that when the first application is configured, the first application is prohibited from accessing the network resource using the third network access point. In this case, the second control unit 14 prohibits the first application from sending or receiving information using the third network access point, and prohibits the first application from accessing the network resource using the third network access point in order to improve network security. After the network security is improved, security of a user resource that accesses the network is accordingly improved.

Further, in this embodiment of the present disclosure, a quantity of first applications that are in an electronic device and for which the network access permission needs to be configured is limited. If the electronic device directly accesses the second network access point after being powered on, when another application accesses the network resource, the electronic device needs to change an access point configuration. Therefore, in this embodiment of the present disclosure, after the electronic device is powered on, the foregoing accessing unit 12 shown in FIG. 7 may further be configured to access a fourth network access point, where the fourth network access point does not belong to the first type of network access point such that the another application can directly access the network resource after the electronic device is powered on.

Figure 8:
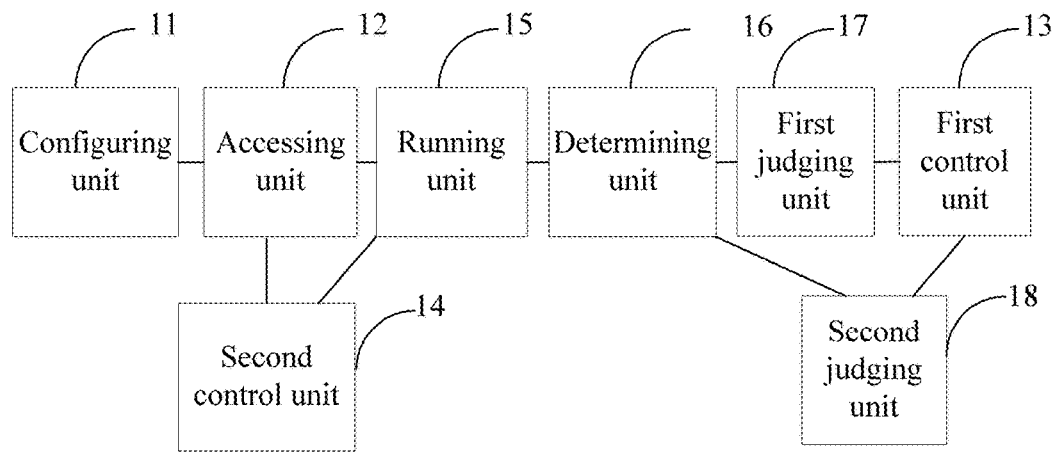
FIG. 8 is another schematic structural diagram of a network access control apparatus according to an embodiment of the present disclosure.

Correspondingly, based on FIG. 7, the network access control apparatus provided in this embodiment of the present disclosure may further include a running unit 15, a determining unit 16, a first judging unit 17, and a second judging unit 18, as shown in FIG. 8.

The running unit 15 is configured to run the first application. The determining unit 16 is configured to determine that a network access point in a currently available network access point is a fifth network access point.

After the first application runs, the determining unit 16 detects the currently available network access point, and after the currently available network access point is detected, one of the currently available network access point is selected as the fifth network access point. An available network access point refers to a network access point whose network connection function is activated and that is located in network coverage corresponding to the network access point.

The first judging unit 17 is configured to, if the fifth network access point belongs to the first type of network access point, use the fifth network access point as the second network access point.

The second judging unit 18 is configured to, if the fifth network access point does not belong to the first type of network access point, use a sixth network access point as the second network access point, where the sixth network access point belongs to the first type of network access point.

Figure 9:
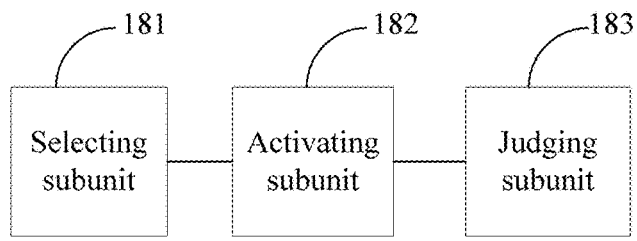
FIG. 9 is a schematic diagram of a sub-structure of a network access control apparatus according to an embodiment of the present disclosure.

In this embodiment of the present disclosure, a schematic structural diagram of the second judging unit 18 is shown in FIG. 9. The second judging unit 18 may include a selecting subunit 181, an activating subunit 182, and a judging subunit 183.

The selecting subunit 181 is configured to select at least one first network access point in the first type of network access point as the sixth network access point. The selected first network access point may be a network access point configured by the configuring unit 11, and certainly the selected first network access point may also be a network access point that the electronic device accesses after the electronic device runs the first application, where the network access point is a trusted network access point selected by the user. After a network access point is selected by the user, the electronic device identifies that the network access point has trust permission in order to identify a trust degree of the network access point. For a trust degree identifier of the network access point, refer to Table 1.

The activating subunit 182 is configured to activate a network connection function that is used to connect the selected sixth network access point. The network connection function may be a wireless network connection function, where the wireless network connection function may include at least one of the following network connection functions: a BLUETOOTH network connection function, a WI-FI network connection function, a 2G/3G/4G network connection function, a ZIGBEE network connection function, a WAPI network connection function, and the like. Certainly, the network connection function may also be a wired network connection function, which includes a USB network connection function, an Ethernet connection function, and the like.

In addition, the network connection function may include both a wireless network connection function and a wired network connection function. A type of the network connection function is the same as a type of the sixth network access point. If the sixth network access point is a WI-FI network access point, when the network connection function a WI-FI network connection function.

The judging subunit 183 is configured to, if the selected sixth network access point is available, use the sixth network access point as the second network access point.

In this embodiment of the present disclosure, activation refers to enabling the network connection function. For example, the electronic device performs actions such as turning on a WI-FI switch, turning on a data traffic switch, and turning on a BLUETOOTH switch, and corresponding network connection functions are activated. All wireless network connection functions have a specific use range limit. Therefore, being available is that in a current environment, the selected sixth network access point can be found by the electronic device and can be used for connection.

The WI-FI network connection function is used as an example. Activating the network connection function that is used to connect the selected sixth network access point is turning on the WI-FI switch of the electronic device. Then, a nearby available WI-FI network access point is found using a WI-FI module of the electronic device, and a network access point corresponding to the sixth network access point is searched for from the nearby available WI-FI network access point, and if the network access point is found, it indicates that the sixth network access point is available currently, and if the network access point is not found, the sixth network access point is unavailable currently.

When all the foregoing apparatus embodiments are applied to an electronic device that supports access of at least two types of network access points at the same time, in all the foregoing apparatus embodiments, the accessing unit 12 is further configured to keep a connection to the second network access point. The first control unit 13 is further configured to keep the first application accessing the network resource using the second network access point, and the second control unit 14 may control the another application to access the network resource using the third network access point, which improves flexibility of access point configuration.

It can be understood that the electronic device may include multiple network modules, and each network module represents that access of a type of network access point is supported by the electronic device. For example, when the electronic device has a mobile network module and a WI-FI network module, it indicates that the electronic device can support access to both a mobile network and a WI-FI network. The mobile network may be a 2G network, or a 3G network, or an LTE network that is provided by an operator, which further needs to be determined by the mobile network module in the electronic device. Certainly, if the electronic device has two same network modules, such as WI-FI network modules, the electronic device can also support access to two WI-FI networks.

In addition, in all the foregoing apparatus embodiments, the second control unit 14 may further be configured to, if the third network access point does not belong to the first type of network access point, stop the first application in order to prevent leakage of user data and improve security of the user data.

The foregoing network access control apparatus may be included in the electronic device and control execution of the first application and the another application in the electronic device. For a specific structure and a working process of the network access control apparatus, refer to the foregoing apparatus embodiments and method embodiments, and details are not described again.

Corresponding to the foregoing method embodiments and apparatus embodiments, an embodiment of the present disclosure further provides an electronic device, where the electronic device includes a network interface, a processor, and a memory.

The memory is configured to store network access permission of a first application, where the network access permission includes allowing the first application to access a network resource using a first type of network access point, and the first type of network access point includes at least one first network access point.

In this embodiment of the present disclosure, the first network access point may be a wireless network access point, where the wireless network access point may include at least one of the following access points: a 2G network access point, a 3G network access point, an LTE network access point, a WI-FI network access point, a BLUETOOTH network access point, a ZIGBEE network access point, and a WAPI network access point. The first network access point may also be a wired network access point, where the wired network access point may include an Ethernet access point, a USB network shared access point, and the like. Certainly, the first network access point may also include both a wireless network access point and a wired network access point. Further, the electronic device may allocate any one type of or multiple types of access points to a first application according to an application feature of the first application, which is not limited in this embodiment of the present disclosure.

In addition, the first network access point may also be a network access point that has trust permission, where the trust permission is used to identify a trust degree of the network access point. The trust degree of the network access point may be identified using a network identifier shown in Table 1.

The network interface is configured to access a second network access point, where the second network access point belongs to the first type of network access point.

The processor is configured to configure the network access permission of the first application, when the first application is running, allow the first application to access the network resource using the second network access point, configured to control the network interface to be switched from the second network access point to a third network access point for access, and if the third network access point does not belong to the first type of network access point, prohibit the first application from accessing the network resource using the third network access point.

After the electronic device is powered on, the network interface may directly access the second network access point that belongs to the first type of network access point, where the second network access point is a first network access point in the first type of network access point in order to ensure that when the electronic device runs the first application, the processor may allow the first application to access the network resource using the second network access point, thereby improving execution efficiency of the first application.

The network resource is an information resource that is propagated using a communication device and that is managed using network software using a computer system, such as a video uploaded to a network.

When the network interface accesses the third network access point, if the third network access point does not belong to the first type of network access point, it indicates that when the first application is configured, the first application is prohibited from accessing the network resource using the third network access point. In this case, the processor prohibits the first application from sending or receiving information using the third network access point, and prohibits the first application from accessing the network resource using the third network access point in order to improve network security. After the network security is improved, security of a user resource that accesses the network is accordingly improved.

In addition, before accessing the second network access point, the network interface may also first access a fourth network access point, where the fourth network access point does not belong to the first type of network access point. The processor runs the first application, and determines that a network access point in a currently available network access point is a fifth network access point. If the fifth network access point belongs to the first type of network access point, the fifth network access point is used as the second network access point, and the network interface is instructed to access the second network access point.

An available network access point refers to a network access point whose network connection function is activated and that is located in network coverage corresponding to the network access point.

If the fifth network access point does not belong to the first type of network access point, the processor uses a sixth network access point as the second network access point, where the sixth network access point belongs to the first type of network access point.

A process in which the processor uses the sixth network access point as the second network access point may include selecting at least one first network access point in the first type of network access point as the sixth network access point, activating a network connection function that is used to connect the selected sixth network access point, and if the selected sixth network access point is available, using the sixth network access point as the second network access point.

The selected first network access point may be a configured network access point, and certainly the selected first network access point may also be a network access point that the network interface accesses after the electronic device runs the first application, where the network access point is a trusted network access point selected by a user. After a network access point is selected by the user, the processor identifies that the network access point has trust permission in order to identify a trust degree of the network access point. For a trust degree identifier of the network access point, refer to Table 1.

In this embodiment of the present disclosure, activation refers to enabling the network connection function. For example, the electronic device performs actions such as turning on a WI-FI switch, turning on a data traffic switch, and turning on a BLUETOOTH switch, and corresponding network connection functions are activated. The network connection function may be a wireless network connection function, where the wireless network connection function may include at least one of the following network connection functions: a BLUETOOTH network connection function, a WI-FI network connection function, a 2G/3G/4G network connection function, a ZIGBEE network connection function, a WAPI network connection function, and the like. Certainly, the network connection function may also be a wired network connection function, which includes a USB network connection function, an Ethernet connection function, and the like.

In addition, the network connection function may include both a wireless network connection function and a wired network connection function. A type of the network connection function is the same as a type of the sixth network access point. If the sixth network access point is a WI-FI network access point, when the network connection function a WI-FI network connection function.

All wireless network connection functions have a specific use range limit. Therefore, being available is that in a current environment, the selected sixth network access point can be found by the electronic device and can be used for connection.

The WI-FI network connection function is used as an example. Activating the network connection function that is used to connect the selected sixth network access point is turning on the WI-FI switch of the electronic device. Then, a nearby available WI-FI network access point is found using a WI-FI module of the electronic device, and a network access point corresponding to the sixth network access point is searched for from the nearby available WI-FI network access point, and if the network access point is found, it indicates that the sixth network access point is available currently, and if the network access point is not found, the sixth network access point is unavailable currently.

In addition, if the third network access point does not belong to the first type of network access point, the processor may also stop the first application. The electronic device may include multiple network interfaces, and after a network interface accesses the third network access point, another network interface may still keep a connection to the second network access point. The processor keeps the first application accessing the network resource using the second network access point.

It should be noted that, all embodiments in this specification are described in a progressive manner. What each embodiment emphasizes is a difference from another embodiment, and mutual reference may be made to a same or similar part between the embodiments. The method embodiments are basically the same as the system embodiments and therefore are described briefly, and for the relevant parts, reference may be made to the corresponding description of the apparatus embodiments.

Finally, it should be noted that in this specification, relational terms such as first and second are used only to differentiate an entity or operation from another entity or operation, and do not necessarily require or imply that any actual relationship or sequence exists between these entities or operations. Moreover, the terms "include", "comprise", and any variation thereof are intended to cover a non-exclusive inclusion. Therefore, in the context of a process, method, object, or device that includes a series of elements, the process, method, object, or device not only includes such elements, but also includes other elements not specified expressly, or may include inherent elements of the process, method, object, or device. If no more limitations are made, an element limited by "include a/an . . . " does not exclude other same elements existing in the process, method, object, or device which includes the element.

The foregoing is merely preferred implementation manners of embodiments of the present disclosure. It should be noted by a person of ordinary skill in the art that various improvements and modifications may be further made without departing from the principles of the embodiments of the present disclosure and should be also construed as falling within the protection scope of the embodiments of the present disclosure.

What is claimed is:

1. A method for choosing a network access point, implemented by an electronic device, wherein a target application is installed in the electronic device, and wherein the method comprises:
    configuring a trusted network access point list (TNAPL) for the target application, wherein the TNAPL comprises information of at least one trusted network access point, and wherein the information of the at least one trusted network access point comprises a network type of the at least one trusted network access point;
    establishing a connection with a current network access point;
    retrieving information of the current network access point;
    determining whether the current network access point is included in the TNAPL according to the information of the current network access point and the TNAPL; and
    transmitting data associated with the target application through the connection with the current network access point when the current network access point is included in the TNAPL,
    wherein when the current network access point is not included in the TNAPL, the method further comprises:
    searching for a backup network access point for the target application, wherein the backup network access point is currently available for the electronic device and is in the TNAPL;
    establishing a connection to the backup network access point; and
    transmitting the data associated with the target application through the connection with backup network access point, and
    wherein after establishing the connection to the backup network access point, the method further comprises keeping the connection with the current network access point.

2. The method according to claim 1, wherein searching for the backup network access point for the target application comprises:
    choosing a first candidate network access point in the TNAPL;
    determining whether the first candidate network access point is currently available for the electronic device; and
    determining that the first candidate network access point is the backup network access point when the first candidate network access point is currently available for the electronic device.

3. The method according to claim 2, wherein before determining whether the first candidate network access point is currently available for the electronic device, the method further comprises turning on a first network access function relating to the first candidate network access point.

4. The method according to claim 1, wherein searching for the backup network access point for the target application comprises:
    choosing a second candidate network access point from at least one network access points which are currently available for the electronic device;
    determining whether the second candidate network access point is in the TNAPL; and
    determining that the second candidate network access point is the backup network access point when the second candidate network access point is in the TNAPL.

5. The method according to claim 4, wherein before choosing the second candidate network access point from the at least one network access points which are currently available for the electronic device, the method further comprises turning on a second network access function relating to the second candidate network access point.

6. The method according to claim 1, wherein another application other than the target application is installed in the electronic device, and wherein after establishing the connection with the current network access point, the method further comprises transmitting data associated with the other application through the connection with the current network access point.

7. The method according to claim 1, wherein another application other than the target application is installed in the electronic device, and wherein after establishing the connection with the backup network access point, the method further comprises transmitting data associated with the other application through the connection with the current network access point.

8. An electronic device for choosing a network access point, comprising:
    a processor; and
    a memory coupled to the processor and configured to store a target application which is executed by the processor,
    wherein the processor is configured to:
    configure a trusted network access point list (TNAPL) for the target application, wherein the TNAPL comprises information of at least one trusted network access point, and wherein the information of the at least one trusted network access point comprises a network type of the at least one trusted network access point;
    establish a connection to a current network access point;
    determine whether the current network access point is included in the TNAPL according to the information of the current network access point and the TNAPL;
    transmit data associated with the target application through the connection with the current network access point when the current network access point is included in the TNAPL;
    search for a backup network access point for the target application when the current network access point is not included in the TNAPL, wherein the backup network access point is currently available for the electronic device and is in the TNAPL;
    establish a connection with the backup network access point;
    transmit the data associated with the target application through the connection with the backup network access point; and
    keep the connection with the current network access point after establishing the connection with the backup network access point.

9. The electronic device according to claim 8, wherein the processor is further configured to:
    choose a first candidate network access point in the TNAPL;
    determine whether the first candidate network access point is currently available for the electronic device; and
    determine that the first candidate network access point is the backup network access point when the first candidate network access point is currently available for the electronic device.

10. The electronic device according to claim 9, wherein the processor is further configured to turn on a first network access function relating to the first candidate network access point before determining whether the first candidate network access point is currently available for the electronic device.

11. The electronic device according to claim 8, wherein the processor is further configured to:
choose a second candidate network access point from at least one network access points which are currently available for the electronic device;
determine whether the second candidate network access point is in the TNAPL; and
determine that the second candidate network access point is the backup network access point when the second candidate network access point is in the TNAPL.

12. The electronic device according to claim 11, wherein the processor is further configured to turn on a second network access function relating to the second candidate network access point before choosing the second candidate network access point from the at least one network access points which are currently available for the electronic device.

13. The electronic device according to claim 8, wherein the memory is further configured to store another application other than the target application, wherein the other application is executed by the processor, and wherein the processor is further configured to transmit data associated with the other application through the connection with the current network access point after establishing the connection with the current network access point.

14. The electronic device according to claim 8, wherein the memory is further configured to store another application other than the target application, wherein the other application is executed by the processor, and wherein the processor is further configured to transmit data associated with the other application through the connection with the current network access point after establishing the connection with the backup network access point.

15. The method according to claim 1, wherein the network type of the at least one trusted network access point comprises a $2^{nd}$ generation (2G) network, a $3^{rd}$ generation (3G) network, a WI-FI network, or a Long Term Evolution (LTE) network.

16. The electronic device according to claim 8, wherein the network type of the at least one trusted network access point comprises a $2^{nd}$ generation (2G) network, a $3^{rd}$ generation (3G) network, a WI-FI network, or a Long Term Evolution (LTE) network.

* * * * *